US010419777B2

(12) United States Patent
Mukherjee et al.

(10) Patent No.: US 10,419,777 B2
(45) Date of Patent: Sep. 17, 2019

(54) NON-CAUSAL OVERLAPPED BLOCK PREDICTION IN VARIABLE BLOCK SIZE VIDEO CODING

(71) Applicant: GOOGLE LLC, Mountain View, CA (US)

(72) Inventors: Debargha Mukherjee, Cupertino, CA (US); Yue Chen, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 158 days.

(21) Appl. No.: 15/387,797

(22) Filed: Dec. 22, 2016

(65) Prior Publication Data

US 2018/0184118 A1    Jun. 28, 2018

(51) Int. Cl.
*H04N 19/583* (2014.01)
*H04N 19/167* (2014.01)
*H04N 19/176* (2014.01)

(52) U.S. Cl.
CPC ......... *H04N 19/583* (2014.11); *H04N 19/167* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 7,260,148 B2 | 8/2007 | Sohm | |
| 2005/0078755 A1* | 4/2005 | Woods | H04N 19/119 375/240.24 |
| 2006/0018381 A1 | 1/2006 | Luo et al. | |
| 2006/0165176 A1 | 7/2006 | Raveendran et al. | |
| 2011/0142132 A1* | 6/2011 | Tourapis | H04N 19/597 375/240.16 |

(Continued)

FOREIGN PATENT DOCUMENTS

EP    1489849 A1    12/2004

OTHER PUBLICATIONS

Bankoski, et al., "Technical Overview of VP8, an Open Source Video Codec for the Web", Jul. 11, 2011, 6 pp.

(Continued)

*Primary Examiner* — Lindsay J Uhl
(74) *Attorney, Agent, or Firm* — Young Basile Hanlon & MacFarlane, P.C.

(57) ABSTRACT

A method for processing a selected portion of a video, the selected portion of the video having a plurality of blocks. The method includes obtaining current prediction parameters for all of a plurality of adjacent blocks from the plurality of blocks that are adjacent to a current block from the plurality of blocks in the selected portion of the video, generating a base prediction for the current block from the plurality of blocks using the current prediction parameters associated with the current block, identifying adjacent prediction parameters from the current prediction parameters for a first adjacent block from the plurality of adjacent blocks, determining an overlap region within the current block and adjacent to the first adjacent block, and generating, for each pixel within the overlap region, an overlapped prediction for the pixel as a function of the base prediction and a prediction based on the adjacent prediction parameters.

17 Claims, 10 Drawing Sheets

(56) References Cited

U.S. PATENT DOCUMENTS

2012/0250769 A1* 10/2012 Bross ............... H04N 19/56
                                                         375/240.16
2014/0023138 A1*  1/2014 Chen ................ H04N 19/597
                                                         375/240.12
2016/0366416 A1* 12/2016 Liu .................. H04N 19/52

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion for International Patent Application No. PCT/US2017/050065 dated Nov. 14, 2017.
Yiting Liao et al; "A low complexity architecture for video coding with overlapped block motion compensation"; 2010 17th IEEE International Conference on Image Processing, (ICIP 2010); Sep. 2010, pp. 26-29.
Kuo, Tien-ying et al. "Fast Overlapped Block Motion Compensation with Checkerboard Block Partitioning"; IEEE Transactions on Circuits and Systems for Video Technology, vol. 8, No. 6, Oct. 1998; p. 705-712.
Orchard, Michael T et al., "Overlapped Block Motion Compensation: An Estimation-Theoretic Approach"; IEEE Transactions on Image Processing, vol. 3, No. 5, Sep. 1994; p. 693-699.

* cited by examiner

NON-CAUSAL OVERLAPPED BLOCK PREDICTION IN VARIABLE BLOCK SIZE VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to video coding using non-causal overlapped block prediction.

One aspect of the disclosure is a method for processing a selected portion of a video, the selected portion of the video having a plurality of blocks. The method includes obtaining current prediction parameters for all of a plurality of adjacent blocks from the plurality of blocks that are adjacent to a current block from the plurality of blocks in the selected portion of the video, generating a base prediction for the current block from the plurality of blocks using the current prediction parameters associated with the current block, identifying adjacent prediction parameters from the current prediction parameters for a first adjacent block from the plurality of adjacent blocks, determining an overlap region within the current block and adjacent to the first adjacent block, and generating, for each pixel within the overlap region, an overlapped prediction for the pixel as a function of the base prediction and a prediction based on the adjacent prediction parameters.

Another aspect of the disclosure is a method for encoding a selected portion of a video, the selected portion of the video having a plurality of blocks. The method includes calculating current prediction parameters for all of a plurality of adjacent blocks from the plurality of blocks that are adjacent to a current block from the plurality of blocks in the selected portion of the video. Determining an overlapped prediction for a current block is performed subsequent to calculating the current prediction parameters by generating a base prediction for the current block from the plurality of blocks using the current prediction parameters associated with the current block, identifying adjacent prediction parameters from the current prediction parameters for a first adjacent block from the plurality of adjacent blocks, determining an overlap region within the current block and adjacent to the first adjacent block, and generating the overlapped prediction for each pixel from the overlap region as a function of the base prediction and a prediction based on the adjacent prediction parameters. The method also includes encoding the current block using the one or more overlapped predictions.

Another aspect of the disclosure is a method for decoding a selected portion of a video from a video bitstream, the selected portion of the video having a plurality of blocks. The method includes receiving current prediction parameters for all of a plurality of adjacent blocks from the plurality of blocks that are adjacent to a current block from the plurality of blocks in the selected portion of the video from the video bitstream. The method also includes determining an overlapped prediction for the current block, subsequent to receiving the current prediction parameters, by generating a base prediction for the current block from the plurality of blocks using the current prediction parameters associated with the current block, identifying adjacent prediction parameters from the current prediction parameters for a first adjacent block from the plurality of adjacent blocks, determining an overlap region within the current block and adjacent to the first adjacent block, and generating the overlapped prediction for each pixel within the overlap region as a function of the base prediction and a prediction based on the adjacent prediction parameters. The method also includes decoding the current block using the overlapped prediction.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
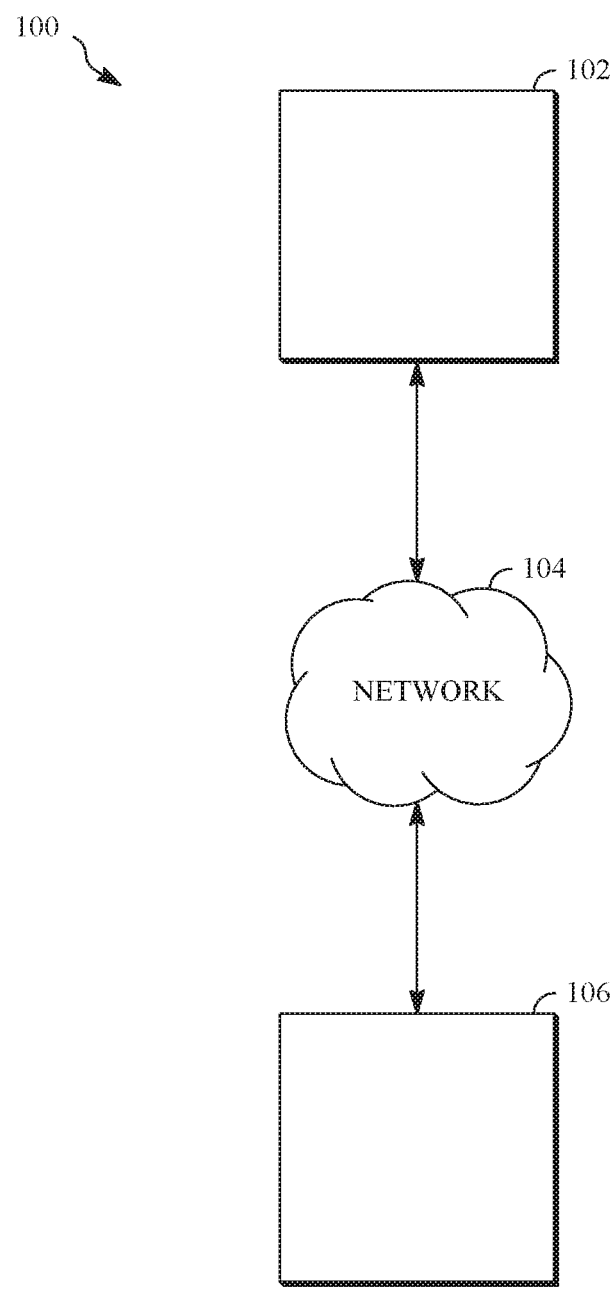
FIG. 1 is a schematic of a video encoding and decoding system.

Compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter-prediction.

One of the parameters in inter-prediction is a motion vector that represents the spatial displacement of the previously coded block relative to the current block. The motion vector can be identified using a method of motion estimation, such as a motion search. In the motion search, a portion of a reference frame can be translated to a succession of locations to form a prediction block that can be subtracted from a portion of a current frame to form a series of residuals. The horizontal and vertical translations corresponding to the location having, e.g., the smallest, residual can be selected as the motion vector. Bits representing the motion vector can be included in the encoded bitstream to permit a decoder to reproduce the prediction block and decode the portion of the encoded video bitstream associated with the motion vector.

Prediction parameters such as motion vectors can be determined using overlapped prediction modes that utilize information from blocks that are adjacent to the current block. The disclosure herein is directed to non-causal overlapped prediction modes that utilize information from blocks that are non-causally related to the current block, including blocks that appear after the current block in a coding order and have not yet be encoded or decoded at the time of encoding or decoding of the current block.

In some implementations, a determination is made on a block-by-block basis as to whether to use non-causal overlapped block motion compensation. This determination can be indicated by setting or reading a flag in the video bitstream. Non-causal prediction is not permitted in some video codecs, because prediction and reconstruction is performed in a coding order on a per-block basis. To permit non-causal prediction, prediction parameters for all blocks in a portion of a frame can be determined or obtained first, such as by encoding them in or decoding them from the bitstream prior to other information. Then, the remainder of encoding or decoding processes are performed for the selected portion of the video frame, including processes such as prediction, residual coding, and parameter coding not related to prediction.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
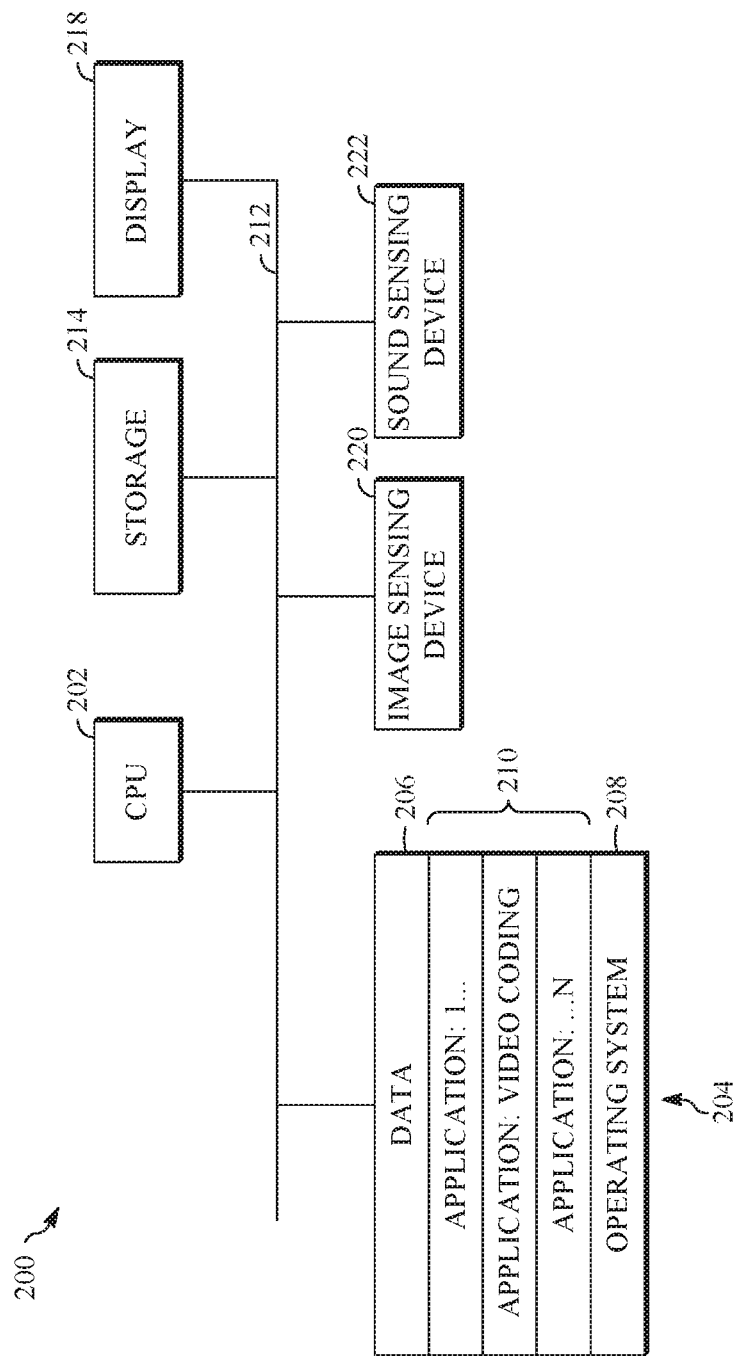
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
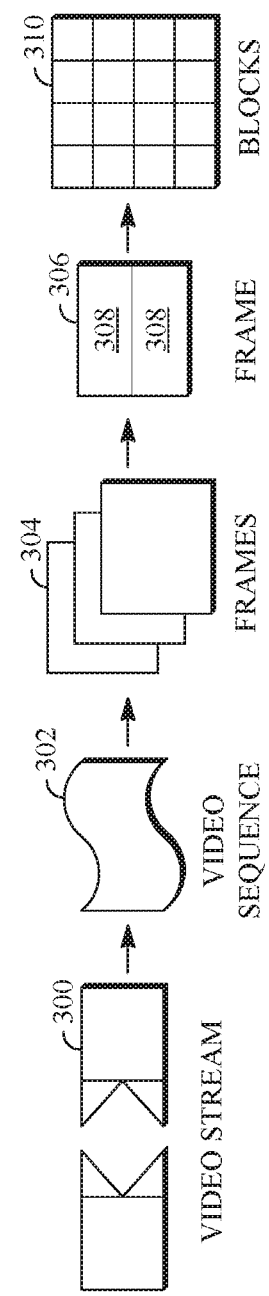
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 may be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
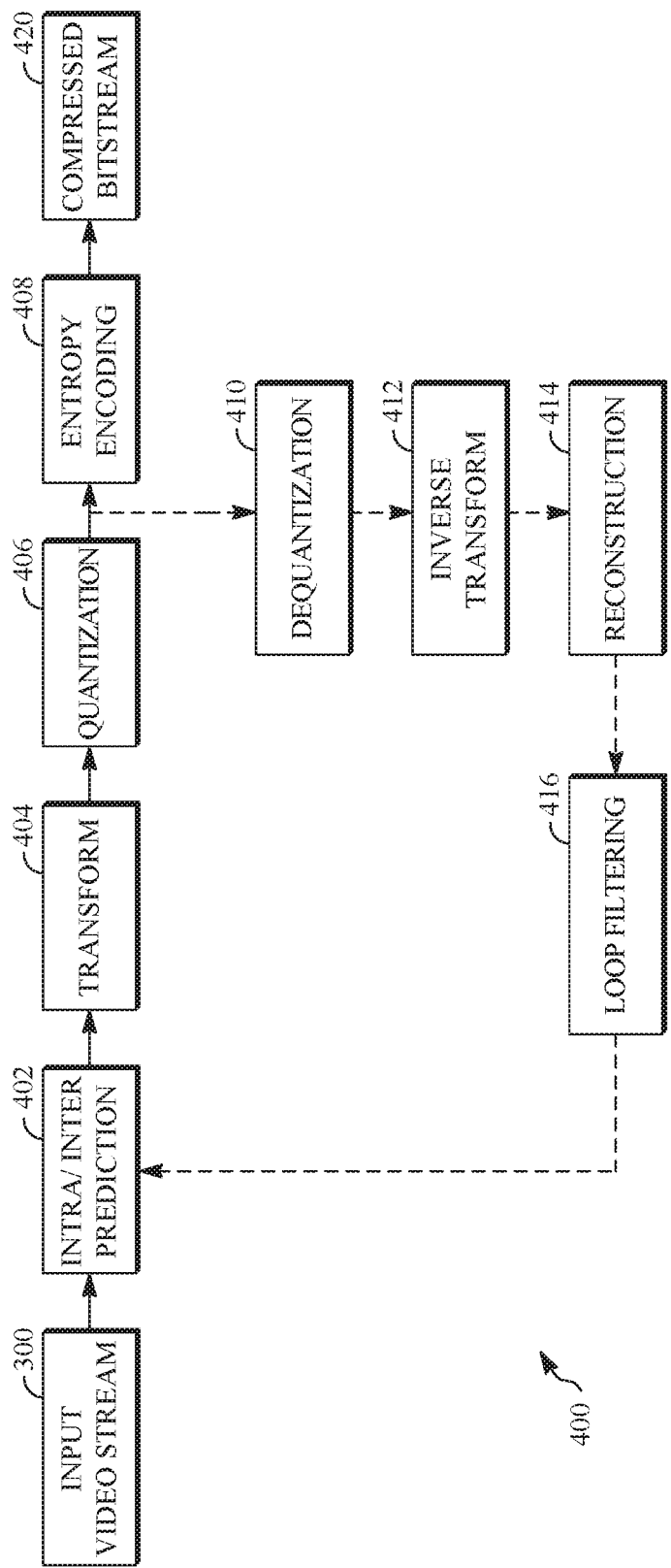
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4 and as further described with reference to FIGS. 6-14. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
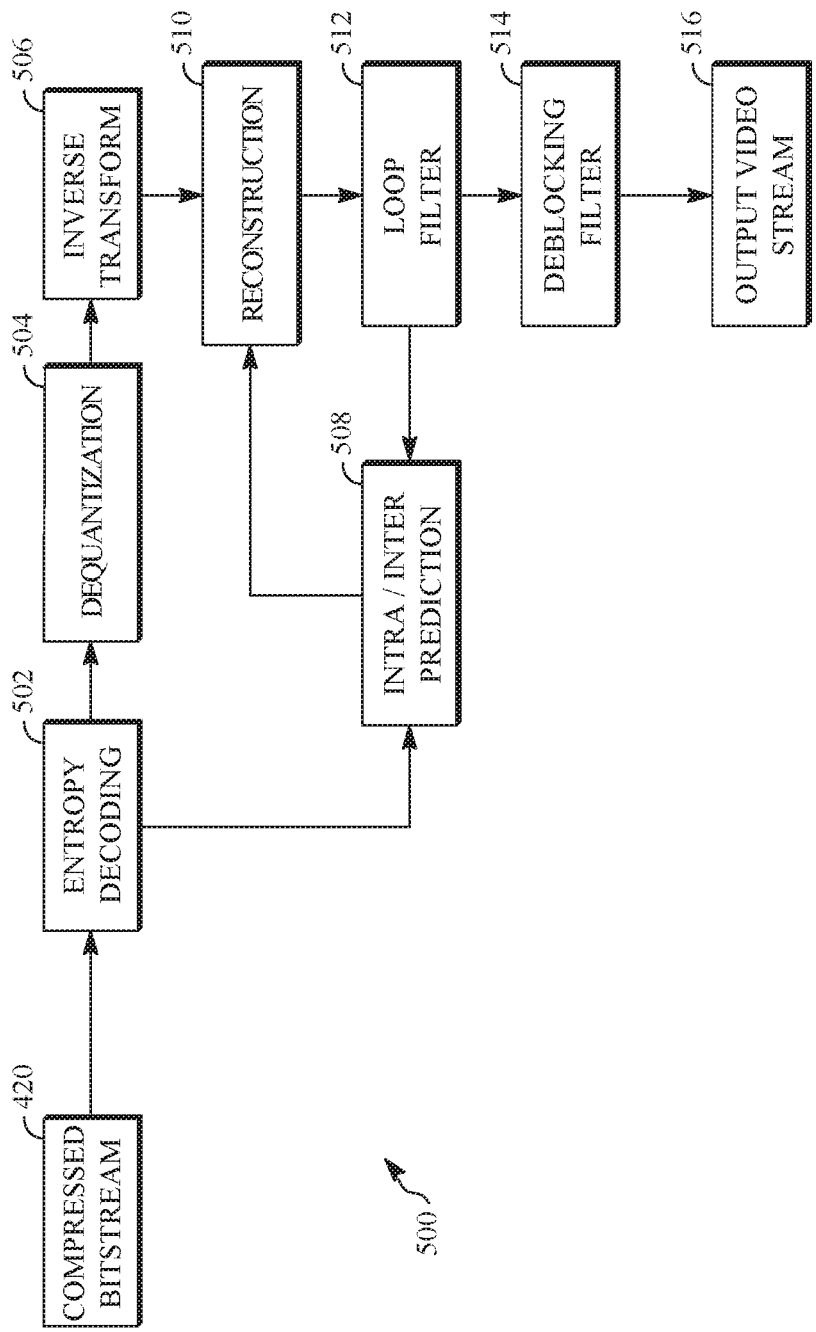
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5 and in FIG. 8 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As described with reference to the encoder 400 of FIG. 4, a block can be encoded using intra-prediction or inter-prediction. The type of prediction used to predict a block is often referred to as a prediction mode, and there may be more than one intra-prediction mode and more than one inter-prediction mode available to encode, and subsequently decode, a block. In this case, an encoder, such as the encoder 400, may select a prediction mode by testing some or all of the available prediction modes to select the prediction mode resulting in the lowest error, the highest compression, or a combination thereof. This selection process may be performed, for example, in a rate-distortion loop of the encoder, for example in the intra/inter prediction stage 402, where the rate represents the bit cost of encoding the block and the distortion represents the errors in the decoded block as compared to the original block. A frame, and in particular blocks of a frame, may be encoded or decoded by motion compensated prediction (i.e., inter-prediction) using non-causal overlapped block prediction, as is described in more detail below.

Figure 6:
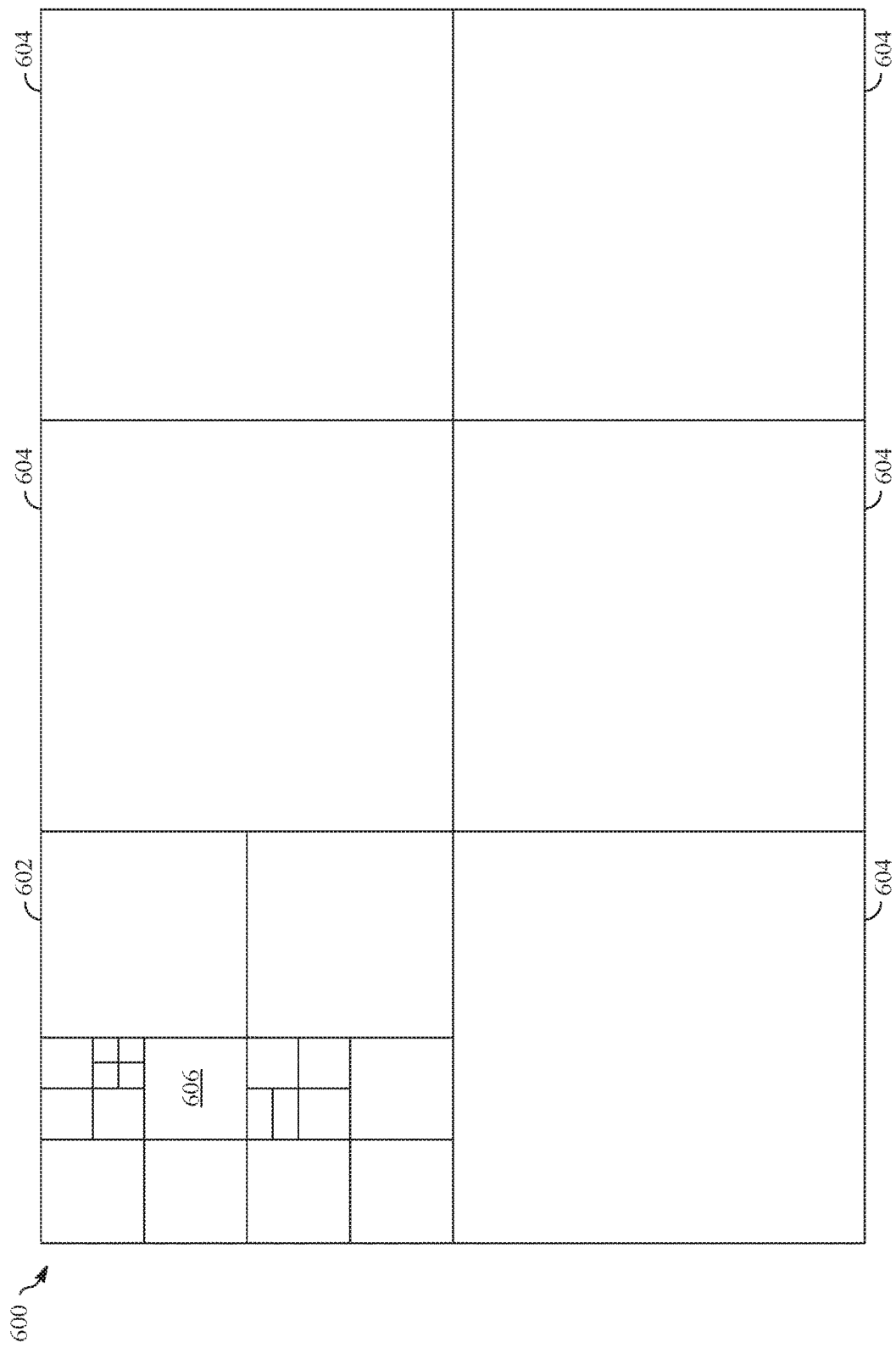
FIG. 6 is an illustration that shows part of a video frame.

FIG. 6 is an illustration showing part of a video frame 600 to be processed at least in part using an overlapped block prediction mode that includes non-causal overlapped block prediction. The video frame 600 is divided spatially into a plurality of portions. As an example, the portions could be 64×64 pixel partitions. In the illustrated example, the video frame 600 includes a selected portion 602 that is has been selected from the plurality of portions for processing, and additional portions 604. The selected portion 602 and the additional portions 604 can be divided into blocks of fixed or variable size. In the illustrated example, the selected portion 602 is divided into blocks including a current block 606. The current block 606 is the block from the selected portion that is currently being processed, and operations described herein, such as determination of motion parameters, are generally performed with respect to the current block 606 of the selected portion of the video frame 600 unless noted otherwise.

Figure 7:
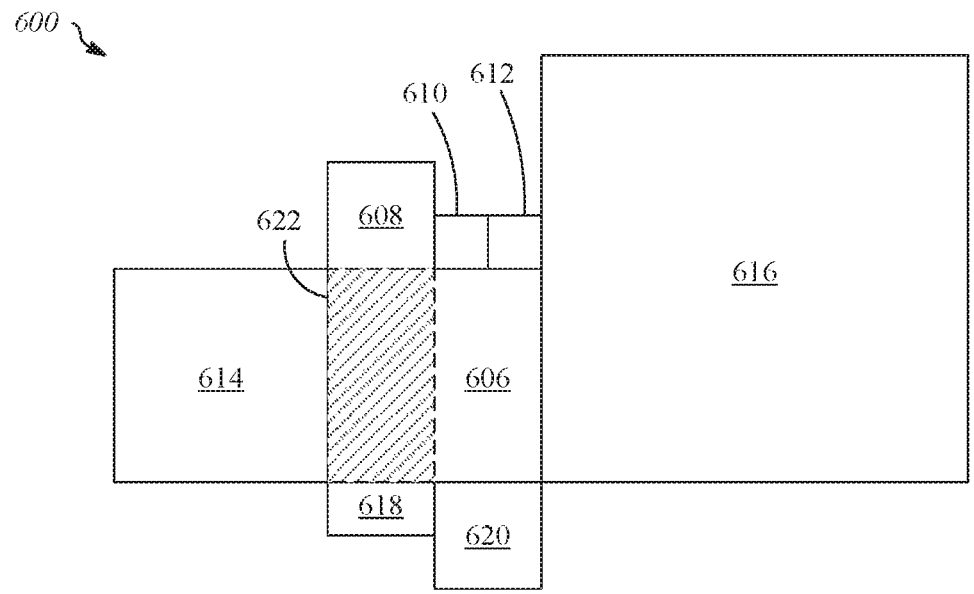
FIG. 7 is an illustration that shows part of a selected portion of the video frame including a current block and a first example of an overlap region.

FIG. 7 is an illustration that shows part of the selected portion 602, including the current block 606 and a plurality of adjacent blocks. Each side of the current block may be adjacent to a single block, or multiple blocks. Some of the adjacent blocks may have known motion parameters. For blocks that appear before the current block 606 in an encoding order or a decoding order (e.g., a left-to-right and top-to-bottom order), the motion parameters of the adjacent blocks may be known from encoding or decoding the blocks normally according to the encoding order or the decoding order. In encoding operations, the motion parameters of the adjacent blocks may be known by determining the motion parameters in a previous encoding operation that uses only block-based prediction modes or a causal overlapped block prediction mode. In decoding operations, the motion parameters of the adjacent blocks may be obtained prior to processing the current block 606, such as by obtaining motion parameters for all of the blocks in the selected portion 602 of the video frame 600 prior to processing the current block 606. To facilitate obtaining motion parameters for all of the blocks in the selected portion 602 of the video frame 600 prior to processing the current block 606, the video bitstream may be encoded such that motion parameter information for each portion of the video frame 600 is separated from the remaining block information and appears in the video bitstream prior to the block information.

In the illustrated example, the current block 606 is a 16×16 pixel square block. A first top adjacent block 608, a second top adjacent block 610, and a third top adjacent block 612 are adjacent to the current block 606 and are located along a top edge of the current block 606. The first top adjacent block 608 is an 8×8 pixel square block. The second top adjacent block 610 and the third top adjacent block 612 are each 4×4 pixel square blocks. A left adjacent block 614 is adjacent to the current block 606 and is located along a left edge of the current block 606. The left adjacent block 614 is a 16×16 pixel square block. A right adjacent block 616 is adjacent to the current block 606 and is located along a right edge of the current block 606. The right adjacent block 614 is a 32×32 pixel square block. A first bottom adjacent block 618 and a second bottom adjacent block 620 are adjacent to the current block 606 and are located along a bottom edge of the current block 606. The first bottom adjacent block 618 is an 8×4 pixel square block and the second bottom adjacent block 620 is an 8×8 pixel square block. The block sizes illustrated in FIG. 7 are examples, and any other block sizes may be used.

An overlap region may be determined for use in an overlapped prediction for the current block 606 with respect to one or more of the adjacent blocks. For example, pixels in the current block 606 may be grouped within a defined overlap region that is determined for one of the first top adjacent block 608, the second top adjacent block 610, the third top adjacent block 612, the left adjacent block 614, the right adjacent block 616, the first bottom adjacent block 618, or the second bottom adjacent block 620.

As shown in FIG. 7, a first overlap region 622 of the current block 606 may be determined for the left adjacent block 614. The first overlap region 622 is located in the current block 606 and is located adjacent to the left adjacent block 614. As will be explained herein, motion parameters for the first overlap region 622 may be determined using a causal overlapped block prediction mode, since adjacent blocks above and to the left of the current block 606 are previously encoded or decoded when a left-to-right and top-to-bottom coding order is used.

Figure 8:
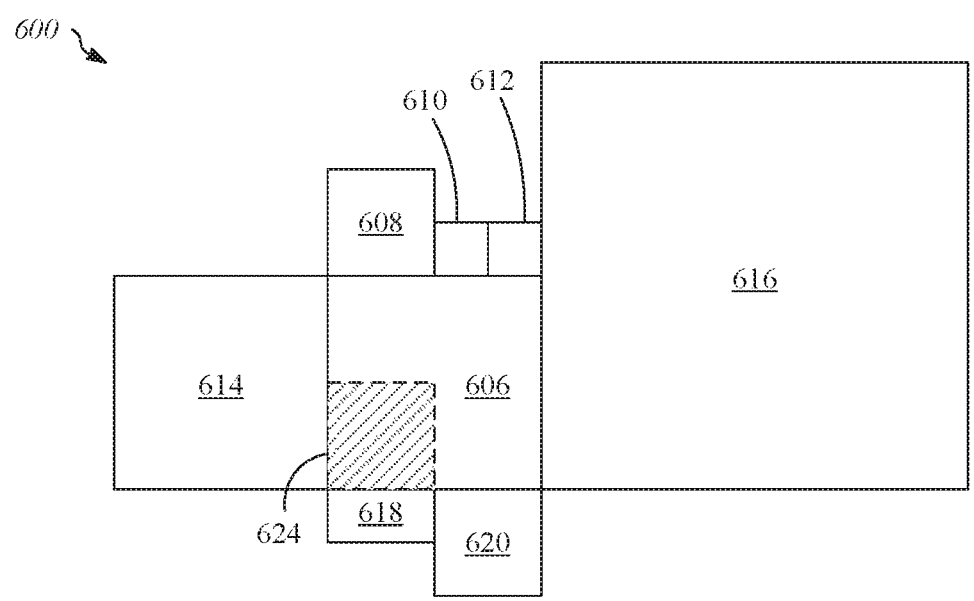
FIG. 8 is an illustration that shows part of a selected portion of the video frame including a current block and a second example of an overlap region.
Figure 9:
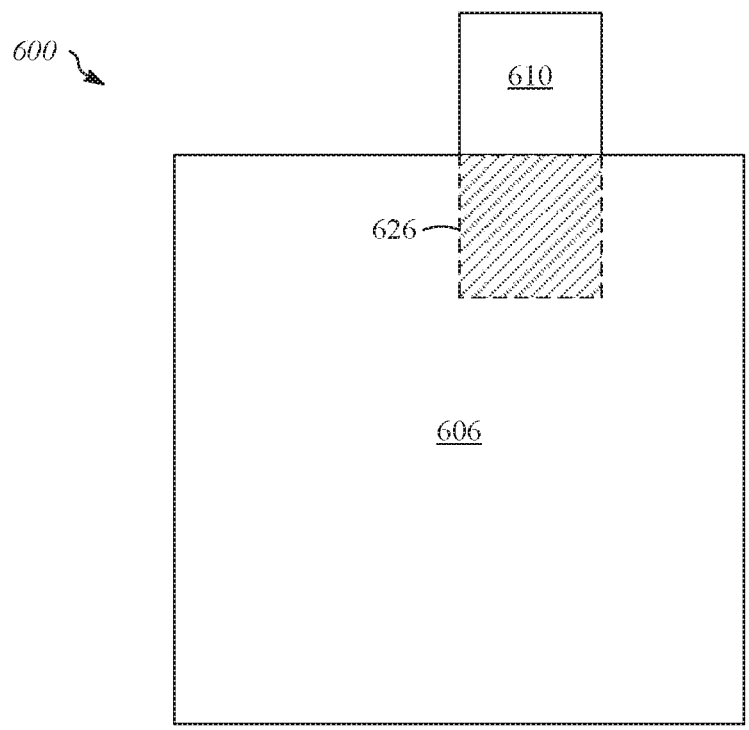
FIG. 9 is an illustration that shows part of a selected portion of the video frame including a current block and a third example of an overlap region.
Figure 10:
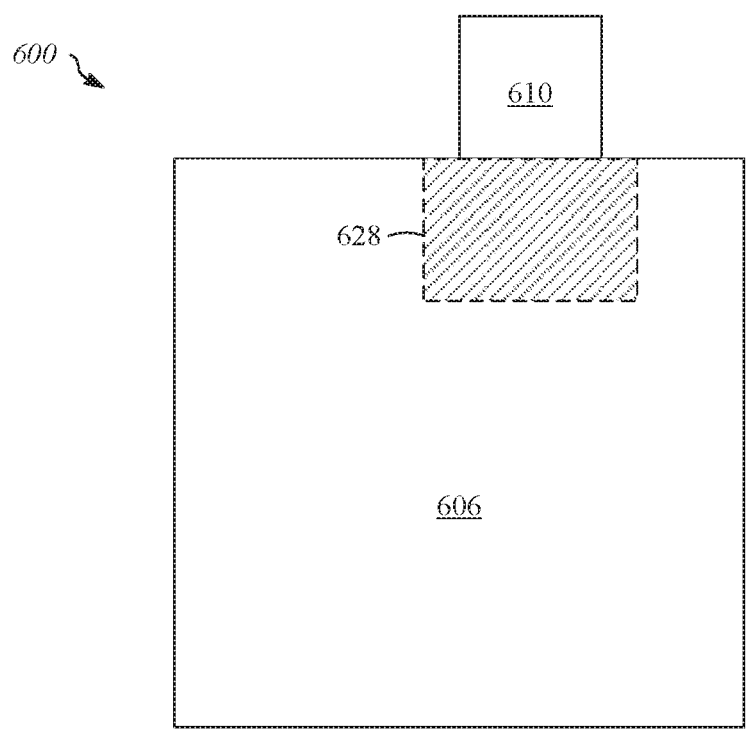
FIG. 10 is an illustration that shows part of a selected portion of the video frame including a current block and a fourth example of an overlap region.
Figure 11:
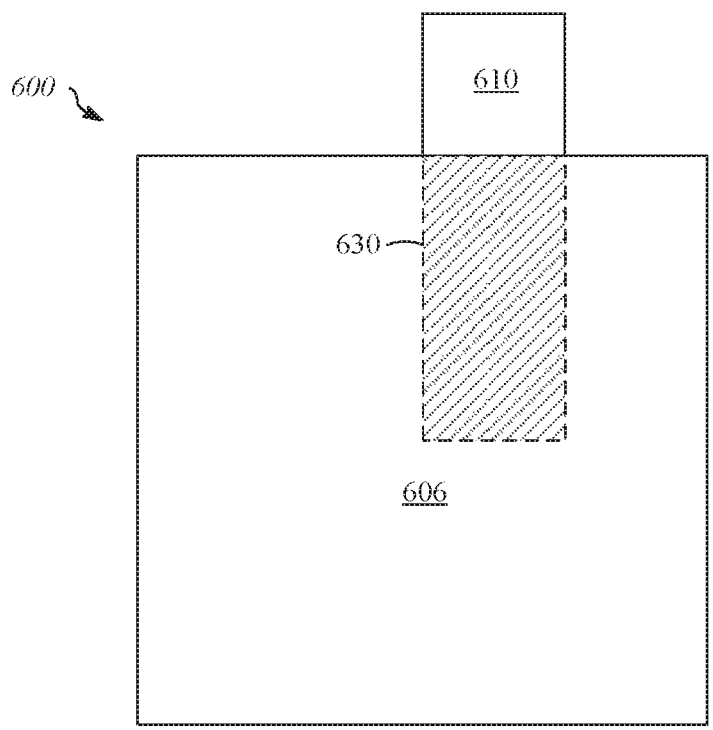
FIG. 11 is an illustration that shows part of a selected portion of the video frame including a current block and a fifth example of an overlap region.

As shown in FIG. 8, a second overlap region 624 of the current block 606 may be determined for the first bottom adjacent block 618. The second overlap region 624 is located in the current block 606 and is located adjacent to the first bottom adjacent block 618. As will be explained herein, motion parameters for the second overlap region 624 may be determined using a non-causal overlapped block prediction mode, since adjacent blocks below and to the right of the current block 606 are not previously encoded or decoded when a left-to-right and top-to-bottom coding order is used.

As will be explained herein, multiple overlap regions can be defined and used in a single coding process. A group of pixels may belong to more than one overlap region, and the motion parameters determined for the multiple overlap regions can be combined to define an overlapped predictor block. For example, an overlapped predictor block for the current block 606 can be defined using motion parameters determined for each of the first overlap region 622 and the second overlap region 624, which include a common group of pixels.

Several methods can be utilized to determine the size of an overlap region. One method for determining the size of an overlap region is based on the size of the corresponding adjacent block. The overlap region may have a column dimension v that corresponds to the adjacent block, a row dimension w that corresponds to the adjacent block, or both. As one example, a v×w overlap region size may correspond to an x×y adjacent block size, where v=x and w=y. Thus, an 8×8 overlap region would be used for an 8×8 adjacent block, as shown by the overlap region 626 of FIG. 9. As another example, one or both of the column dimension v or the row dimension w may be a multiple or fraction of the column dimension x or the row dimension y of the adjacent block. For example, in FIG. 10, an overlap region 628 has a column dimension v that is 1.5 times the column dimension x of the adjacent block 610 and a row dimension w that corresponds to the row dimension y of the adjacent block 610, such that a v×w overlap region size correspond to an x×y adjacent block size, where v=1.5x and w=y.

One method for determining the size of an overlap region is based on the size of the current block. The overlap region may have column dimension v that corresponds to the column dimension of the current block, a row dimension w that corresponds to the row dimension of the current block, or both. Thus, a v×w overlap region size may correspond to an x'×y' current block size, where v=x' and w=y'. As an example, the current block may be smaller than an adjacent block, and the overlap region size for one dimension may be limited to the size of the current block at the boundary of the adjacent block.

As another example, an overlap region may have a width or height that is equal to a fraction of the width or height of the current block, such as half the width or height of the current block. With respect to an adjacent block above or below the current block, the width of the overlap region can be equal to the width of the adjacent block and the height of the overlap region can be a fraction (e.g., half) the height of the current block. Thus, a v×w overlap region size may correspond to an x×y adjacent block size and an x'×y' current block size where v=x and w=y'/2, as shown by the overlap region 630 of FIG. 11. With respect to an adjacent block to the left or right of the current block, the height of the overlap region can be equal to the height of the adjacent block and the width of the overlap region can be a fraction (e.g., half)

the width of the current block. Thus, a v×w overlap region size may correspond to an x×y adjacent block size and an x'×y' current block size where v=x'/2 and w=y.

As per the foregoing examples, overlap region sizes may correspond to the adjacent block size, the current block size, or both the adjacent and current block sizes. Other variants of overlap region sizes may be used.

A weighted function index that indicates which one of various discrete overlap region sizes is used as a common size for all overlap regions may be included in the encoded bitstream. Encoding may include encoding the index at a video stream, segment, frame, partition, or block level. Decoding the block may include decoding the index to determine which of the discrete overlap region sizes to use for the overlapped prediction weighted function. As an example, a first index may indicate that all overlap regions have a size with a first dimension equal to the adjacent block edge length, and a second dimension that extends one half the length of current block. A second index may indicate that all overlap regions have a first dimension equal to the adjacent block edge, and a second dimension that extends one quarter the length of the current block. Encoding may include determining a weighted function that maps different relative sizes for each of the overlap regions, depending on prediction parameters for the adjacent blocks. For example, encoding may include generating multiple prediction block candidates according to various weighted functions, determining a rate distortion cost estimate for each candidate, and selecting the weighted function that provides the best rate distortion optimization.

Various overlap region sizes may be determined by using a set of discrete sizing functions, from which the overlap region size may be adaptively selected as a function of a difference between prediction parameters of the current block and the adjacent prediction parameters of the corresponding adjacent block. A comparison between motion vectors of the current block and motion vectors of the corresponding adjacent block for the overlap region may indicate a motion vector difference that exceeds a threshold, and one or more dimensions of a default overlap region size may be adjusted. The determination of the difference of the prediction parameters between the adjacent block and the current block may be based on a comparison of the temporal distance between reference frames for the adjacent block and for the current block respectively. For example, the reference frame for the adjacent block may be the previously encoded frame and the reference frame for the current block may be a frame encoded prior to the previously encoded frame, and the difference may be measured by number of frames, or temporal distance, between the reference frames.

Both the adjacent block and the current block may be predicted according to an inter-prediction, in which case overlap region sizing of the weighted function may be according to the above description. Alternatively, one of the adjacent block or the current block may be predicted according to an intra-prediction with the other being predicted according to an inter-prediction, thus a usable comparison of prediction parameters may not be available. When a comparison of prediction parameters is not available, the weighted function may define an overlap region size according to a predetermined function of current block size. For example, the overlap region size may be defined as a small overlap region, such as being based on ¼ of current block length. As another example, the size for the overlap region may be set to zero, or no overlap region, since the adjacent prediction may be considered too different from the current block prediction, and overlapped prediction can be omitted.

A defined overlap region size may range between (0,0), which may indicate no overlap region, and a x'×y', which may indicate the current block size. The weighted function for the overlapped prediction may adjust the defined overlap region size based on a difference between prediction parameters. For example, for an overlap region, such as the overlap region 624 shown in FIG. 8, motion vector values of the first bottom adjacent block 618 may be very similar to motion vector values of the current block, such as the current block 606, the a size adjustment to the defined overlap size may be omitted. As another example, the motion vector values of an adjacent block, such as the first bottom adjacent block 618, may differ from motion vector values of a current block, such as the current block 606, by a difference that is greater than an established threshold, and the overlap region size may be adjusted. For example, the overlap region may be expanded as or may be contracted. Adapting the overlap region size based on differences between prediction parameters, may include adapting the weighted function of the overlapped prediction such that the weighting can be weighted to favor the contribution of the current block prediction parameters or the adjacent block prediction parameters depending on which prediction parameters optimize the overlapped prediction of the current block. For example, the weighted function may weight a contribution from the adjacent block prediction parameters to zero for some pixels in the current block by setting at least one dimension of the overlap region to be less than a corresponding dimension of the current block.

An overlap region may be omitted on a condition that the difference between prediction parameters of the current block and the adjacent block is less a threshold (i.e., the size of the overlap region is 0x0), such that there is little or no difference between prediction parameters of the current block and the adjacent block. For example, the current block prediction may be substantially similar to the adjacent block prediction, the difference between prediction parameters may be less than a minimum threshold, and the size of the overlap region may be 0x0.

A base prediction may be determined for current block 606 using prediction parameters for current block 606. The base prediction may then be the base prediction for each overlap region, such as the overlap region 622 or the overlap region 624. For example, a base prediction block may be determined for the entire current block, such that pixel values for the base prediction may be stored for later use when determining the overlapped prediction for each pixel in the overlap regions of the current block 606.

A prediction may be determined for each of the overlap regions, such as the overlap region 624, based on prediction parameters of the adjacent block associated with the overlap region. For example, a prediction may be determined for the pixels in an overlap region using prediction parameters that include corresponding reference frame and motion vectors for an adjacent block, such as the first bottom adjacent block 618.

An overlapped prediction may be determined for one or more overlap regions as a weighted function of the base prediction and predictions based on the respective adjacent prediction parameters. For example, the overlapped prediction for each pixel in an overlap region, such as the overlap region 624, may be an average of the base prediction value and the prediction pixel value generated based on the respective adjacent prediction parameters. In some implementations, there may be more than one overlap region for a pixel in the current block. For example, two or more adjacent overlap regions may overlap, such as overlap region 622 of FIG. 7 and overlap region 624 of FIG. 8, and the overlapped prediction may be determined as an average of the base prediction based on the prediction parameters for the current block, and n predictions based on the respective prediction parameters for each of the n adjacent blocks associated with the overlap regions. For example, referring to FIGS. 7 and 8, pixels that are located both in overlap region 622 and overlap region 624 correspond to two predictions based on the respective adjacent prediction parameters (i.e., n=2) which may be averaged with the base prediction to determine the overlapped prediction. For example, each pixel in overlap region 624 may be determined as an average of a base prediction using prediction parameters of the current block 606, a prediction based on prediction parameters of the first top adjacent block 608, and a prediction based on prediction parameters of the first bottom adjacent block 618.

The weighted function for overlapped prediction may be a function of distance between the center of the current block and the center of an adjacent block associated with the overlap region. For example, the weighted function may determine an overlapped prediction that favors smaller sized adjacent blocks, which may include pixels located, on average, closer to the current block than larger adjacent blocks, may be more reliable, and to provide a better prediction of the current block. For example, the weighted function may weight overlap region 624 to contribute more heavily to the overlapped prediction of current block 606 than larger overlap region 622, as the center of the first bottom adjacent block 618 is closer to the center of current block 606 compared to the center of the first top adjacent block 608.

Figure 12:
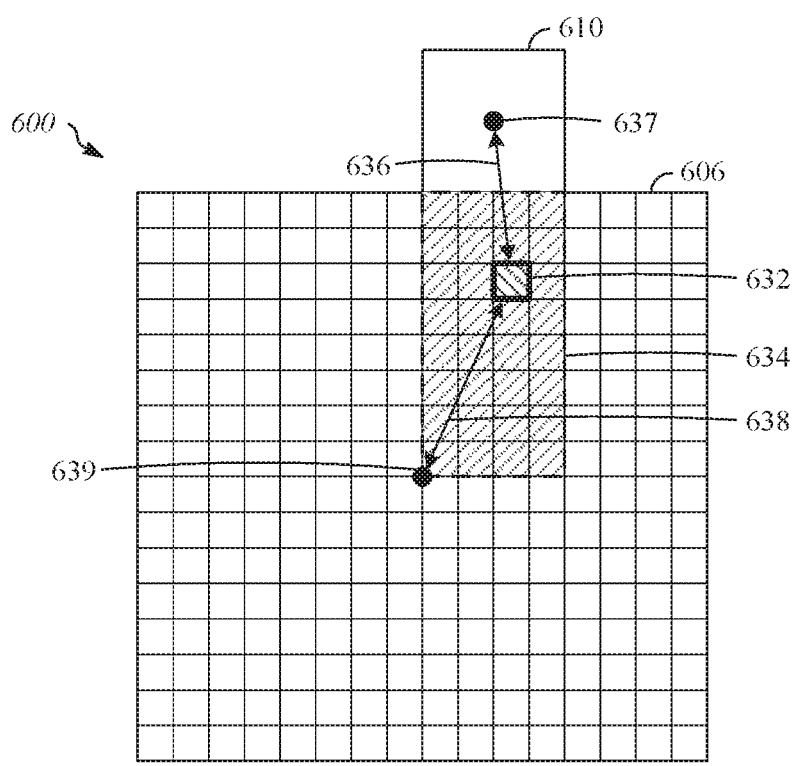
FIG. 12 is an illustration showing application of an example weighted function for overlapped prediction.

FIG. 12 is a block diagram of showing application of an example weighted function for overlapped prediction to the current block 606. The overlapped prediction may be optimized by a weighted average of a first prediction P0 made using current block prediction parameters and n adjacent block-based predictions Pn made using prediction parameters of adjacent blocks. Weightings are applied to each of the predictions example with weight ω0 indicating a weight for prediction P0, and con indicating a weight for prediction Pn. Weighting of the overlapped prediction OP of pixel 632 in overlap region 634 may be expressed as the following:

$$OP = \frac{1}{N+1}\left(\omega_0 P_0 + \sum_{n=1}^{N} \omega_n P_n\right).$$ Equation (1)

One or more predicted pixel values at each pixel in an overlap region may be weighted according to a weighted function based on the relative pixel position with respect to the adjacent block associated with the overlap region. For example, the overlapped prediction may be weighted such that a contribution by the prediction based on adjacent block prediction parameters is greater when the pixel is located relatively nearer to the adjacent block. For example, pixel 632 has a first relative distance 636 to a center 637 of corresponding adjacent block 610 and a relative distance 638 to a center 639 of current block 606. The overlapped prediction weights $\omega_0$, $\omega_n$ may be a function of relative distances 636, 638. For example, $d_0$ may indicate the relative distance from pixel to center of current block, $d_n$ may indicate the relative distance from pixel to center of adjacent block n, and the weighted function may be a proportion of relative distance values, which may be expressed as follows:

$$\omega_0 = \frac{d_0}{d_0 + d_n}$$ Equation (2)

$$\omega_n = \frac{d_n}{d_0 + d_n}.$$ Equation (3)

The overlapped prediction weights $\omega_0$, $\omega_n$ may be a function of a directional relative distance between the pixel and the boundary between the adjacent block and the current block, such as horizontal relative distance or a vertical relative distance. For example, the weighted function may be based on a raised cosine window function in which weights $\omega_0$, $\omega_n$ are equal for a pixel located halfway in overlap region, weights $\omega_0=0$, $\omega_n=1$ for a pixel located at the adjacent edge of overlap region n, and weights $\omega_0=1$, $\omega_n=0$ for a pixel located at the edge of the overlap region farthest from adjacent block n. As another example, overlapped prediction weights $\omega_0$, $\omega_n$ may be a function of a vertical relative distance between the pixel 632 and the nearest edge of the adjacent block, such as a vertical relative distance for the pixel 632 with respect to the second top adjacent block 610.

The type of weighted function used for the overlapped prediction may be encoded with an index, such as by encoder 400 shown in FIG. 4, and included in the compressed video bitstream, such as the compressed video bitstream 404 shown in FIG. 4, as an indication for decoding, such as by the decoder 500 shown in FIG. 5, of which weighted function to use for overlapped prediction. For example, various raised cosine weightings may be mapped to a first set of indexes, and various weighted functions based on relative distance to block center points may be mapped to a second set of indexes.

The weighted function for overlapped prediction may be a combination of any or all weighted functions described in this disclosure. For example, the weighted function may be implemented to weight the overlapped prediction by adaptive adjustment of overlap region size, by weighting each of the base prediction and overlapped predictions for the current block, or a combination thereof.

Figure 13:
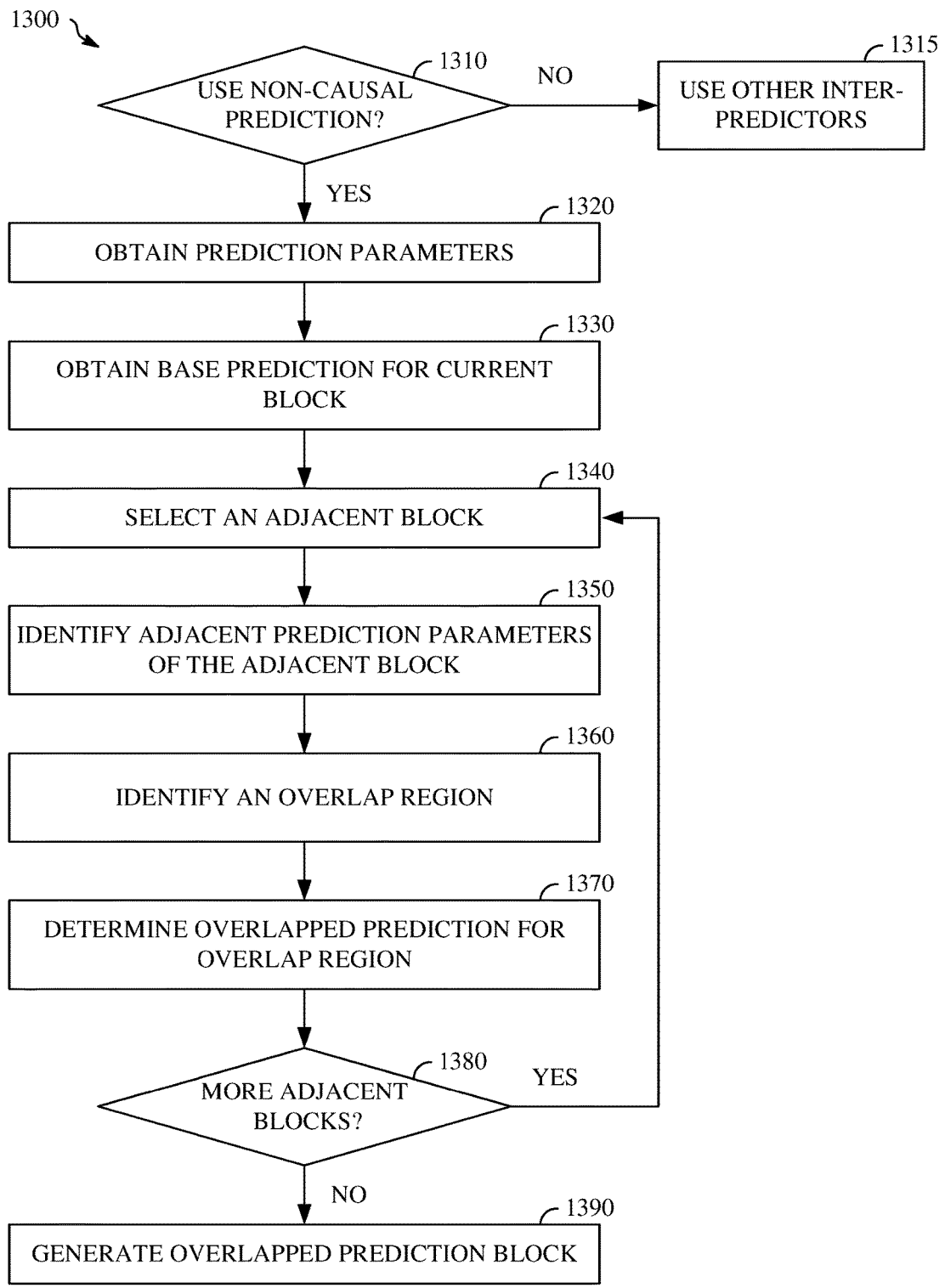
FIG. 13 is a flow diagram showing a process for coding a video including motion compensated prediction using non-causal overlapped block prediction.

FIG. 13 is a flow diagram showing a process 1300 for coding a video including motion compensated prediction using non-causal overlapped block prediction in accordance with an implementation of this disclosure. The process 1300 is applied to one or more frames of a video stream in which at least some blocks of the one or more frames are encoded using inter-prediction. The process 1300 is utilized to encode or decode a current block from a selected portion of the video stream. Additional iterations of the process 1300 are performed to encode or decode other blocks from the selected portion of the video frame. When all blocks from the selected portion of the video frame have been encoded or decoded, a new portion of the one or more frames is selected, and its blocks are processed in the same manner.

The process 1300 can be implemented in an encoder such as in the inter/intra prediction unit 402 of the encoder 400. The process 1300 can be implemented in a decoder, such as in the inter/intra-prediction stage 508 of the decoder 500. For example, the process 1300 can be implemented as a software program that can be executed by computing devices such as transmitting station 102 or receiving station 106. For example, the software program can include machine-readable instructions that can be stored in a memory such as the memory 204 or the secondary storage 214, and that can be executed by a processor, such as CPU 202, to cause the computing device to perform the process 1300.

In FIG. 13, operation 1320 could be deleted if it is assumed that the process 1300 is for a single block in the portion. Alternatively, FIG. 13 may be modified to cover the whole portion, by moving operation 1320 above operation 1310, and repeating the process 1300 for all the blocks. This is possible because, before the original process 1300 is started block by block, the prediction parameters of all blocks in the portion have been decoded.

The process 1300 may include determining whether non-causal overlapped block prediction modes are to be used at operation 1310, using other inter-predictors at operation 1315 obtaining prediction parameters for all blocks in a selected portion of a video frame at operation 1320, obtaining a base prediction for a current block at operation 1330, selecting an adjacent block at operation 1340, identifying prediction parameters of the adjacent block at operation 1350, identifying an overlap region at operation 1360, determining an overlapped prediction for the overlap region at operation 1370, determining whether more adjacent blocks remains to be processed at operation 1380, and generating an overlapped prediction block at operation 1390 once no more adjacent blocks remain to be processed.

In operation 1310, a determination is made as to whether non-causal overlapped prediction modes are to be used for encoding or decoding a current block of a selected portion of a video frame. This determination may be made, for example, by inspecting a setting or a value. In encoding operations, a setting may indicate whether non-causal overlapped prediction modes are allowed and can be considered as candidate prediction modes. The determination as to whether non-causal overlapped prediction modes are to be used in encoding may also be based on a comparison of inter-prediction modes using rate distortion optimization. In decoding operations, use of non-causal overlapped prediction modes may by indicating in the video bitstream, for example, in a value that is encoded at a stream level, a segment level, a frame level, or a partition level. If non-causal overlapped modes are to be used, the process 1300 proceeds to operation 1320. If non-causal overlapped modes are not to be used, the process 1300 proceeds to operation 1315, where other inter-prediction modes are utilized, such as non-overlapped motion compensation prediction modes or causal overlapped motion compensation prediction modes.

In operation 1320, prediction parameters, such as motion parameters, are obtained. Prediction parameters are obtained at least for each adjacent block for which an overlapped prediction will be generated. Obtaining prediction parameters may be accomplished, for example, by receiving the prediction parameters prior to encoding or decoding the corresponding pixels, or by calculating the prediction parameters prior to encoding or decoding the corresponding pixels. As one example, all of the prediction parameters for a selected portion of a video frame can be obtained, by calculating them or reading them from a bitstream, for the selected portion of the video frame prior to processing any of the blocks of the selected portion of the video frame. In such an implementation, the prediction parameters can be stored, such as in memory, prior to processing the current block using the process 1300, and obtaining prediction parameters in operation 1320 includes accessing them from the memory. As another example, all of the prediction parameters for blocks adjacent to the current block can be obtained, by calculating them or reading them from a bitstream, for the current block, and this can be performed on a block-by-block basis during the process 1300.

Operation 1320 allows use of non-causal prediction modes by providing prediction information for blocks that are non-causally related to the current block, and therefore have not yet been encoded or decoded. In encoding operations, prediction parameters for all blocks in the selected portion of the video frame may be obtained by calculating the prediction parameters using one or both of block-based prediction modes and causal prediction modes in a first encoding stage that does not include use of non-causal prediction modes, and all of the prediction parameters for the current block can be determined prior to encoding any of the blocks of the selected portion of the video frame. In decoding operations, prediction parameters, including motion information, may be separated from the pixel information in the video bitstream. Thus, all prediction parameters for a portion of the video frame can be located in the video bitstream prior to the pixel information, and received from the video bitstream by the decoder before the decoder receives the remaining information needed to reconstruct pixel values. The decoder processes all prediction values for the selected portion of the current frame prior to reconstruction of pixel values. The process then proceeds to operation 1330.

A base prediction for the current block may be performed at 1330 using current prediction parameters for the current block. The base prediction for the current block can be made without use of information from adjacent blocks. For example, the base prediction for the current block may be an inter-prediction block that is formed using block based techniques using the prediction parameters for the current block, such as an inter-prediction block formed with block-based motion compensation techniques using the motion parameters for the current block. The prediction parameters for inter-prediction may include a reference frame and motion vectors of the current block. A base prediction block may be determined using the base prediction of the current block.

An adjacent block is selected for processing at operation 1340. Adjacent blocks may be selected in an order, or in any suitable manner. As an example, the next adjacent block in the order that has not previously been process can be selected at operation 1320.

Adjacent prediction parameters may be identified at operation 1350. Identifying the adjacent prediction parameters may include identifying previously encoded or decoded adjacent blocks, and for each of the previously encoded or decoded adjacent blocks, identifying the prediction parameters used for encoding or decoding the adjacent block.

An overlap region may be identified at operation 1360. The overlap region is located inside the current block and is adjacent to the selected adjacent block. Identifying the overlap region may include determining the size of an overlap region for the selected adjacent block as previously described. The overlap region may include a region, such as a grouping of pixels, within the current block that is adjacent to the corresponding adjacent block. The overlapped prediction for the overlap region identified may be determined based on a weighted function of the base prediction determined at 1330 and a prediction generated using the adjacent prediction parameters from the corresponding adjacent block to predict pixel values in the current block within the overlap region. For example, for an overlap region, a prediction block of a size equivalent to the size of the overlap region may be determined using the prediction parameters of the corresponding adjacent block.

An overlapped prediction is determined for the overlap region at operation 1370. Determining the overlapped prediction may be performed for the overlap region based on a weighted combination of the base prediction block pixel values for the current block and the prediction block pixel values generated for the overlap region based on the prediction parameters of the corresponding adjacent block. For example, the pixel value for a pixel in the overlap region may be a weighted average of the pixel value from the base prediction block and the corresponding pixel value from the prediction block generated for the overlap region based on the prediction parameters of the corresponding adjacent block. Generating a prediction blocks for the overlap region may be omitted, and the overlapped prediction may instead be generated on a pixel-by-pixel basis.

At operation 1380, a determination is made as to whether additional adjacent blocks remain to be processed. The process returns to operation 1340 if additional adjacent blocks remain, or the process proceeds to operation 1390 if all adjacent blocks have been processed.

An overlapped prediction block may be generated using overlapped predictions from one or more adjacent blocks at 1390. For example, the overlapped prediction at 1370 may be repeated for one or more overlap region within the current block to form the overlapped prediction block.

A portion of the current block that does not correspond spatially with the overlap regions for the current block may be predicted based on the base prediction.

An overlapped prediction block for the current block may be compared to the base prediction block, and the base prediction or the overlapped prediction block may be used as the prediction block for the current block. Selecting a prediction to be used as the prediction block for the current block can be performed using rate-distortion metrics, such as by selecting the prediction that has a lowest rate-distortion cost. The rate distortion cost can be, for example, a linear combination of a rate used for the quantized residual and a distortion of the reconstruction (prediction+quantized residual). Thus, the encoder 400 may select the prediction block producing lowest rate-distortion cost.

The information that indicates that an overlapped prediction was performed on the current block may be included in the encoded bitstream. For example, an indication of a type of weighted function used for the overlapped prediction may be indicated in the encoded bitstream. In some implementations, an indication of the weighted function may be omitted from the encoded bitstream, and decoding the encoded bitstream may include determining a weighted function using context information of previously decoded adjacent frames. For example, decoding may include identifying a weighted function based on which adjacent block prediction parameters produce the lowest rate-distortion cost.

When the process 1300 is applied to encoding operations, prediction parameters for all blocks from the selected portion of the video frame may be determined in a first pass of a rate-distortion optimization process using block-based prediction modes or causal prediction modes prior to determining prediction parameters using non-causal prediction modes in a second pass of the rate distortion optimization process.

When the process 1300 is applied to decoding operations, prediction parameters may be received from the bitstream for all blocks of the selected portion prior to application of non-causal prediction modes, and determining an overlapped prediction may be performed for all blocks from the selected portion of the video prior to reconstruction of pixel values for the selected portion of the video.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

In one example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for processing a video, the method comprising:
   identifying a video frame of the video that is divided spatially into a plurality of portions having equal pixel dimensions, wherein at least one of the plurality of portions is divided into a plurality of blocks, and the plurality of portions are processed in a coding order;
   obtaining current prediction parameters for any of the plurality of portions before a selected portion of the video frame and for blocks in the selected portion, wherein the selected portion belongs to the at least one of the plurality of portions divided into a plurality of blocks, and the selected portion is before at least one portion of the plurality of portions in the coding order;
   generating a base prediction for a current block from the selected portion using those of the current prediction parameters associated with the current block;
   performing overlapped prediction, for a respective adjacent block that is adjacent to the current block, wherein the adjacent block is only one of a block of the selected portion, or a block of a portion of the plurality of portions that is before the selected portion block in the coding order, by:
      identifying adjacent prediction parameters from the current prediction parameters for the adjacent block;
      determining an overlap region within the current block and adjacent to the adjacent block; and
      generating, for respective pixels within the overlap region, an overlapped prediction as a function of the base prediction and a prediction based on the adjacent prediction parameters, and
      wherein performing the overlapped prediction comprises determining the overlap region as a 0x0 region responsive to the adjacent prediction parameters for the adjacent block indicating that the adjacent block was predicted using a block-based intra-prediction mode; and
   generating an overlapped prediction block for the current block using the overlapped prediction for each adjacent block.

2. The method of claim 1, wherein the adjacent block is non-causally related to the current block by being located within the selected portion after the current block in the coding order.

3. The method of claim 1, wherein obtaining the current prediction parameters includes calculating the current prediction parameters, the method further comprising:
   encoding the current prediction parameters for the blocks of the selected portion within an encoded bitstream before encoding residuals for the blocks of the selected portion.

4. The method of claim 1, wherein obtaining the current prediction parameters includes receiving the current prediction parameters in a video bitstream.

5. The method of claim 4, wherein the current prediction parameters for the blocks in the selected portion are located within the video bitstream before encoded residuals for the blocks in the selected portion.

6. The method of claim 1, wherein a size of the overlap region is determined based on differences between the current prediction parameters for the current block and the adjacent prediction parameters for the adjacent block such that the size of the overlap region is adjusted when a difference between motion vector values for the current block and motion vector values for the adjacent block is greater than a threshold, and the size of the overlap region is not adjusted when a difference between motion vector values for the current block and motion vector values for the adjacent block is less than the threshold.

7. The method of claim 1, wherein the overlapped prediction includes a weighted average of the base prediction and the prediction based on the adjacent prediction parameters of the adjacent block.

8. The method of claim 7, wherein weights for the weighted average are determined as a function of distance between a respective pixel within the overlap region and a boundary between the current block and the adjacent block.

9. The method of claim 7, wherein weights for the weighted average are determined as a function of a first distance between a respective pixel within the overlap region and the center of the current block, and a second distance between the respective pixel within the overlap region and the center of the adjacent block.

10. The method of claim 1, further comprising determining a weighted function for the overlapped prediction based on context information of previously decoded adjacent blocks.

11. A method for encoding a video, the method comprising:
    identifying a video frame of the video that is divided spatially into a plurality of portions having equal pixel dimensions, wherein at least one of the plurality of portions is divided into a plurality of blocks, and the plurality of portions are processed in a coding order;
    calculating current prediction parameters for any of the plurality of portions before a selected portion of the video frame and for blocks in the selected portion, wherein the selected portion belongs to the at least one of the plurality of portions divided into a plurality of blocks, and the selected portion is before at least one portion of the plurality of portions in the coding order;
    performing overlapped prediction for a current block from the selected portion, subsequent to calculating the current prediction parameters, by:
       generating a base prediction for the current block using the current prediction parameters associated with the current block; and for a respective adjacent block that is adjacent to the current block, wherein the adjacent block is only one of a block of the selected portion, or a block of a portion of the plurality of portions that is before the selected portion block in the coding order:
  identifying adjacent prediction parameters from the current prediction parameters for the adjacent block;
  determining an overlap region within the current block and adjacent to the adjacent block; and
  generating an overlapped prediction, for respective pixels from the overlap region, as a function of the base prediction and a prediction based on the adjacent prediction parameters of the adjacent block, and
  wherein performing the overlapped prediction comprises determining the overlap region as a 0x0 region responsive to the adjacent prediction parameters for the adjacent block indicating that the adjacent block was predicted using a block-based intra-prediction mode; and
encoding the current block using an overlapped prediction block generated using one or more of the overlapped predictions.

12. The method of claim 11, wherein the current prediction parameters are calculated using a causal overlapped block prediction mode.

13. A method for decoding a video from a video bitstream, the method comprising:
  receiving a video frame of the video that is divided spatially into a plurality of portions having equal pixel dimensions, wherein at least one of the plurality of portions is divided into a plurality of blocks, and the plurality of portions are processed in a coding order;
  receiving, from the video bitstream, current prediction parameters for any of the plurality of portions before a selected portion of the video frame and for blocks in the selected portion of the video, wherein the selected portion belongs to the at least one of the plurality of portions divided into a plurality of blocks, and the selected portion is before at least one portion of the plurality of portions in the coding order;
  performing overlapped prediction for a current block from the selected portion, subsequent to receiving the current prediction parameters, by:
    generating a base prediction for the current block using the current prediction parameters associated with the current block and
    for a respective adjacent block that is adjacent to the current block, wherein the adjacent block is only one of a block of the selected portion, or a block of a portion of the plurality of portions that is before the selected portion block in the coding order:
      identifying adjacent prediction parameters from the current prediction parameters for the adjacent block;
      determining an overlap region within the current block and adjacent to the adjacent block; and
      generating an overlapped prediction for respective pixels within the overlap region, as a function of the base prediction and a prediction based on the adjacent prediction parameters of the adjacent block, and
      wherein performing the overlapped prediction comprises determining the overlap region as a 0x0 region responsive to the adjacent prediction parameters for the adjacent block indicating that the adjacent block was predicted using a block-based intra-prediction mode; and
  decoding the current block using an overlapped prediction block generated using one or more of the overlapped predictions.

14. The method of claim 13, wherein the current prediction parameters for blocks of the selected portion are separated from residuals in the video bitstream, the method further comprising:
  decoding the current prediction parameters for blocks of the selected portion from the video bitstream before performing the overlapped prediction for the current block and before decoding the residuals for blocks within the selected portion that are after the current block in the coding order.

15. The method of claim 13, wherein performing the overlapped prediction is performed for all adjacent blocks from the selected portion of the video prior to reconstruction of pixel values for the selected portion of the video.

16. The method of claim 1, wherein the current block is adjacent to at least one block of the plurality of portions after the selected portion in the coding order.

17. The method of claim 11, further comprising:
  encoding the current prediction parameters for the blocks in the selected portion into an video bitstream before encoding residuals for the blocks in the selected portion into the encoded bitstream.

* * * * *